United States Patent [19]

Tholen et al.

[11] 4,386,735
[45] Jun. 7, 1983

[54] APPARATUS FOR HEATING AN OPERATOR'S CABIN

[75] Inventors: Paul Tholen, Gladbach; Achim Z. Nieden, Cologne, both of Fed. Rep. of Germany

[73] Assignee: Klockner-Humboldt-Deutz AG, Cologne, Fed. Rep. of Germany

[21] Appl. No.: 225,610

[22] Filed: Jan. 16, 1981

[30] Foreign Application Priority Data

Jan. 17, 1980 [DE] Fed. Rep. of Germany ....... 3001564

[51] Int. Cl.³ .............................................. B60H 1/02
[52] U.S. Cl. .................................. 237/12.3 R; 122/26; 126/247
[58] Field of Search ........................... 237/1 R, 12.3 R; 122/26; 126/247

[56] References Cited

U.S. PATENT DOCUMENTS 4,136,824  1/1979  Kallenbach ................... 237/12.3 R Primary Examiner—Albert J. Makay
Assistant Examiner—Henry Bennett
Attorney, Agent, or Firm—Watson, Cole, Grindle & Watson

[57] ABSTRACT

Apparatus for heating the cabin of a vehicle operated by an internal combustion engine. The apparatus includes a pump for circulating hot oil from the engine sump and a heat exchanger for heating cabin air with heat from the oil. A throttle valve is mounted downstream from the pump to heat the oil and provide a source of heat particularly during warm-up periods. Also the apparatus includes an adjustable flow apportioning valve for selectively and adjustably dividing the flow of oil downstream from the throttle valve into two separate streams. The heat from one of the separate streams is then recycled directly into the oil at the pump suction. This arrangement maximizes the efficient useage of the heat generated in the throttle for cabin heating purposes. Also disclosed is an improved throttle valve for use in connection with the heating apparatus.

21 Claims, 6 Drawing Figures

APPARATUS FOR HEATING AN OPERATOR'S CABIN

BACKGROUND OF THE INVENTION

1. Field of the Invention

The present invention relates to heating apparatus and in particular to apparatus for heating the operator's cabin of a machine driven by an internal combustion engine using heat extracted from hot engine sump oil.

2. Description of the Prior Art

Apparatuses are known for heating the operator's cabin of a machine driven by an internal combustion engine and more particularly the operator's cabin of a vehicle using the heat content of oil from the engine sump. Such apparatus generally includes a hydraulic pump driven by the internal combustion engine and a load element, such as a throttle valve, that is connected at the pump discharge. Such apparatus also generally comprise a fluid to air heat exchanger in the operator's cabin and which is hydraulically connected between the load element and the oil sump. All this is described in pending U.S. application Ser. No. 123,169, filed Feb. 20, 1980 in the name of Moser, et al, assigned commonly with the present application, and claiming priority from West German Patent Application No. P. 29 32 448.9.

An apparatus useful for heating the operator's cabin of a vehicle having a heat exchanger and which utilizes the heat of the lubricating oil is well-known and described in U.S. Pat. No. 4,136,824, corresponding to West German Patent No. P 26 23 621. Such devices, however, have the drawback that calorific power is available only when the engine is at normal operating temperatures, and such temperatures are generally available only when the engine carries a load. The same problem is encountered whether the engine is air or water-cooled. The apparatus described in said application Ser. No. 123,169 improved this state of affairs by providing a hydraulic pump and a load element, more particularly a throttle valve, upstream of the heat exchanger. One disadvantage from such an arrangement, however, is that the amount of heat generated by the throttle valve often causes the temperature to rise, and initially, this rise in temperature produces only a small thermal gradient in the heat exchanger. Thus, the heat contribution is small and mainly the oil in the oil sump and the engine parts are heated. This applies to the warm-up period and to all operating conditions during which the temperature of the lubricating oil in the sump lies below the temperature of the oil returned from the heat exchanger, such as, for example, during long no-load periods and when the outside temperature is low. Such runs counter to the goal of accelerated heating of the operator's cabin and does not justify the large amount of energy expended in the hydraulic- pump drive.

SUMMARY OF THE INVENTION

One object of the invention, therefore, is to release into the heat exchanger, a maximum amount of the mechanically supplied energy for the exclusive heating of the operator's cabin. According to the present invention, this object is achieved by providing an adjustable or controlled flow apportionment device either in the return conduit between the fluid to air heat exchanger and the engine oil sump, or in the conduit between the throttle and the fluid to air heat exchanger. A portion of the apportioned flow may then be diverted to the suction side of the high-pressure supply pump.

The function of utilizing the heat produced in the load element exclusively for heating purposes and not for heating the content of the oil sump is adequately performed by the provision of such adjustable flow apportioner either upstream or downstream of the fluid to air heat exchanger. When the temperature of the oil in the sump has risen, particularly to above the temperature of the oil returned from the exchanger, the flow apportionment valve is adjusted so that the heat supplied to the sump during normal engine operation contributes to the heating.

In particular the objects and aims of the invention are fulfilled by the provision of an apparatus for heating the operator's cabin of a machine driven by an internal combustion engine having an oil sump which comprises hydraulic pump means having a suction and a discharge and first conduit means for hydraulically interconnecting said suction and said sump. A load element having an inlet connection and an outlet connection and operable to heat oil passing therethrough is also provided along with second conduit means hydraulically interconnecting the discharge of the pump means and the inlet connection of the load element. The apparatus further includes fluid to air heat exchanger means adapted for mounting in said cabin for heating air in the latter and conduit structure for hydraulically interconnecting the outlet connection of the load element and said sump. The exchanger is provided with inlet and outlet heating oil connections and the conduit structure comprises third conduit means hydraulically interconnecting the outlet connection of the load element and the inlet connection of the exchanger means and a fourth conduit means for hydraulically interconnecting the outlet connection of the exchanger means and said sump. In particular accordance with the invention, the apparatus includes adjustable flow apportionment means positioned in the conduit structure for selectively dividing the oil flow downstream from said load element into a shunt stream and a sump return stream whereby heat from said shunt stream may be introduced into the oil in said first conduit means, said apportioner being arranged such that said sump return stream is directed to the sump through the conduit structure.

In one form of the invention, the apparatus includes conduit and coupling means for introducing said shunt stream directly into said first conduit means. In another form of the invention the apparatus includes a fluid to fluid heat exchanger located for exchanging heat between the fluid in said shunt stream and the fluid in said first conduit means, the arrangement being such that the shunt stream then flows from the fluid to fluid exchanger and into the sump.

Manifestly, the flow apportionment means may be located upstream or downstream from the fluid to air exchanger, and in its more preferred form, the apparatus may include temperature responsive control means coupled with said flow apportionment means for adjusting the latter as a function of the temperature of the oil at one or more preselected points in the system.

In another aspect, the invention provides a variable throttle valve comprising an elongated throttle member mounted for longitudinal movement, said member having a truncated conical head at the high pressure end thereof and being spring loaded at the other end, there being a compensating port extending through the member from one end thereof to the other end, the latter end being disposed in a chamber presenting a servomechanism, said valve means further including an adjustment valve controlling the flow from the chamber.

DETAILED DESCRIPTION OF THE DRAWINGS

Figure 1:
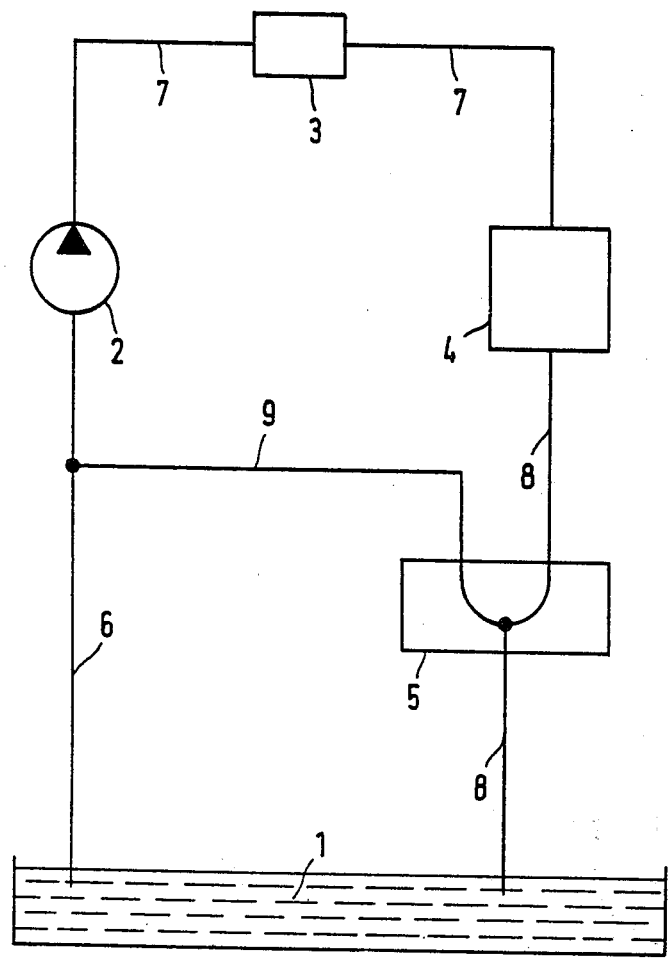
FIG. 1 is a schematic illustration of a flow circuit embodying the concepts and principles of the invention and which includes a flow apportionment device downstream from the fluid to air heat exchanger.

FIG. 1 illustrates the heating apparatus including an oil sump 1, high-pressure supply pump 2, a load element 3 (which generally and preferably is in the form of a throttle valve device), a fluid to air heat exchanger 4, and a flow apportioner 5. Pump 2 is connected to sump 1 by an intake conduit 6 and to fluid to air heat exchanger 4 via a conduit 7 in which load element 3 is connected. A return conduit 8 extends from fluid to air heat exchanger 4 to oil sump 1. In the embodiment shown, flow apportioner 5 is connected into return conduit 8 and to a shunt conduit 9 which is connected with conduit 6 which leads to the suction side of sump 2.

Figure 2:
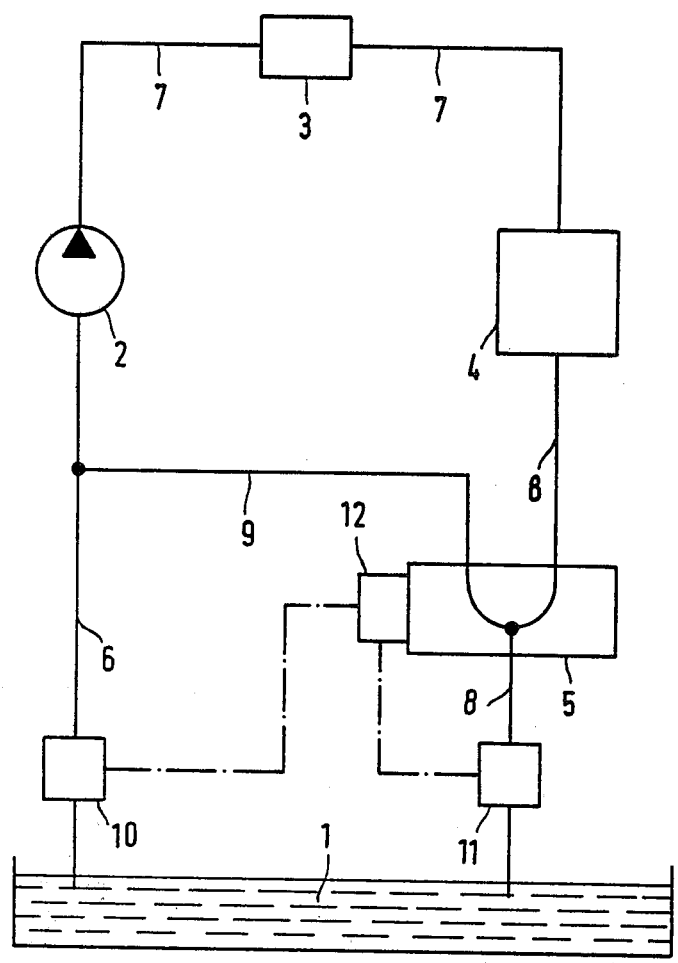
FIG. 2 is a schematic illustration of the circuit of FIG. 1 but with a temperature controller for the flow apportioner.

The arrangement in FIG. 2 is the same as that in FIG. 1 except that temperature sensors 10 and 11 are arranged in intake and return conduits 6 and 8, respectively. These sensors are connected to a controller device at reference point 12 which controls flow apportioning means 5.

Figure 3:
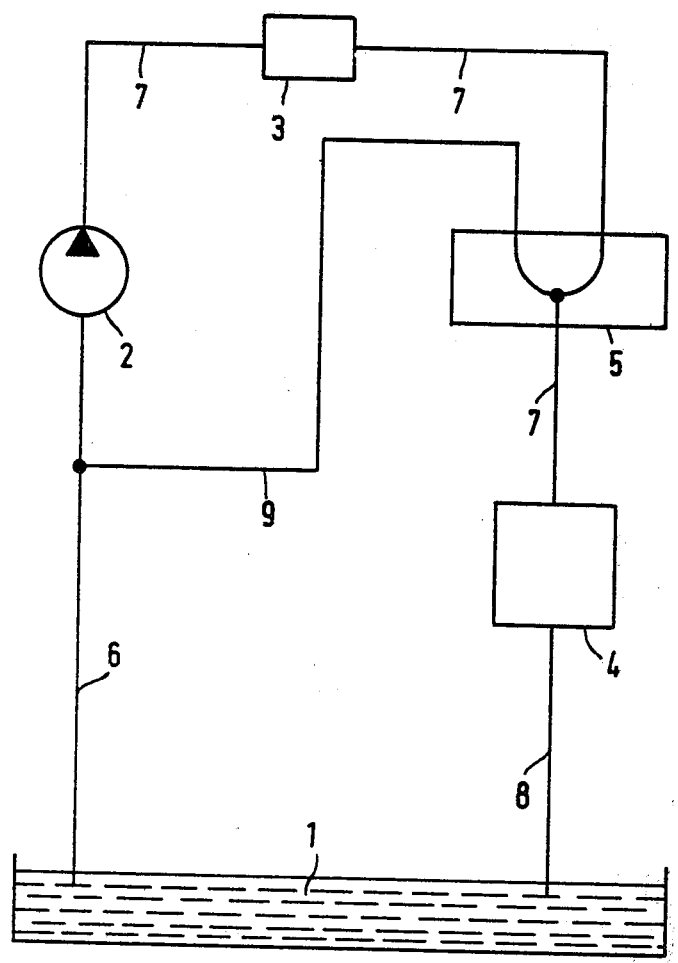
FIG. 3 is a schematic illustration of a circuit embodying the concepts and principles of the invention and which includes a flow apportioner upstream from the fluid to air heat exchanger.

In FIG. 3, flow apportioner 5 is connected in conduit 7 between load element 3 and fluid to air heat exchanger 4. In other respects, the embodiment of FIG. 3 is the same as that of FIG. 1.

Figure 4:
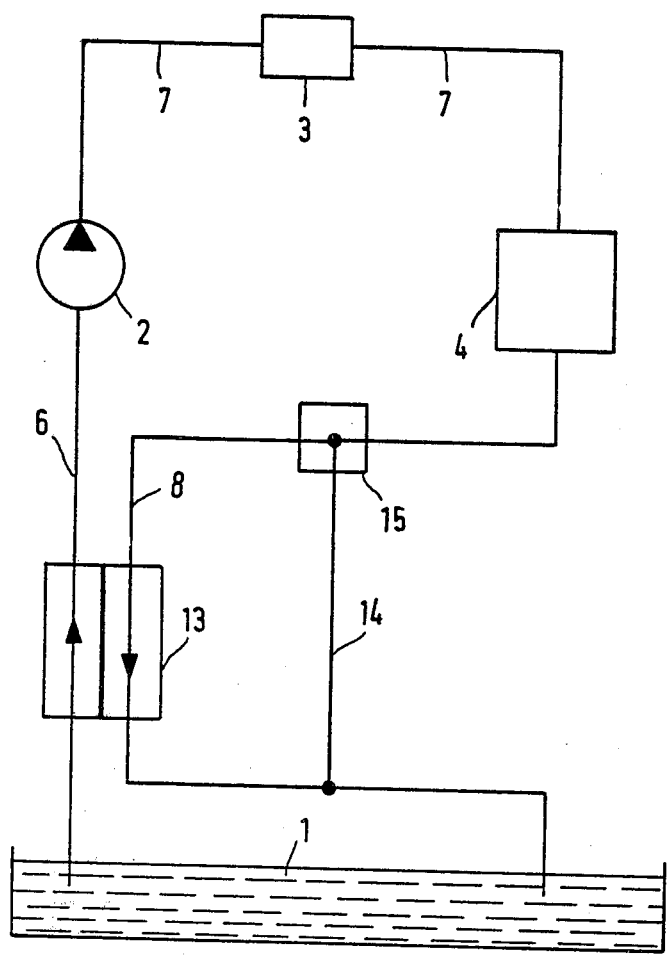
FIG. 4 is a schematic illustration of a circuit embodying the concepts and principles of the invention and which includes a flow apportioner upstream from the fluid to air heat exchanger and which also includes a fluid to fluid heat exchanger for transfer of heat between the oil return line and the pump suction line.

FIG. 4 illustrates a heating apparatus wherein a fluid to fluid heat exchanger 13 is arranged to exchange heat between the fluid in return conduit 8 and the fluid in intake conduit 6. A bypass conduit 14, is connected to a flow apportioner in the nature of a three-way valve 15 and the latter is controlled as a function of the temperature by control means not illustrated. Conduit 14 is connected in parallel relationship to exchanger 13. Valve 15 is preferably arranged such that bypass conduit 14 is opened as the temperature in line 6 increases.

Figure 5:
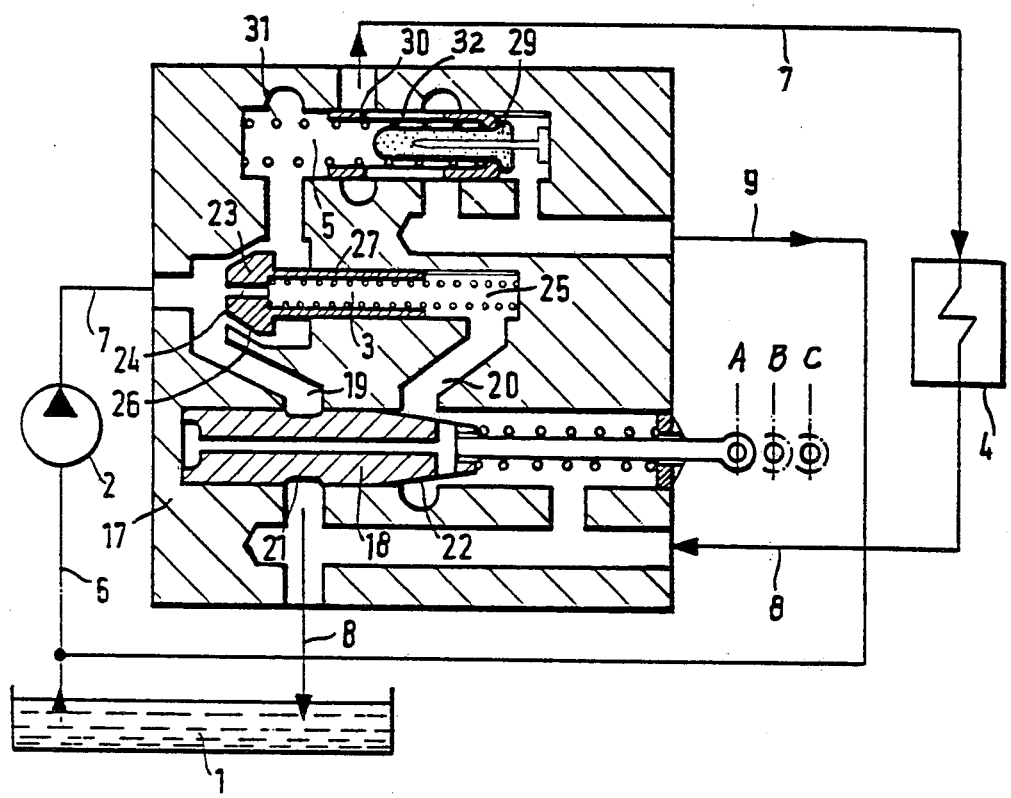
FIG. 5 is a schematic, cross-sectional view of a combination shutoff, adjustment, throttle and flow divider valve that is useful in accordance with the principles and concepts of the invention.

FIG. 5 schematically illustrates a heating system which includes a unitary operating element designed as a variable throttle valve 3 in combination with a shutoff valve 21 and an adjustment valve 22, all integrated within the same housing which also houses flow apportioner 5. The combined shutoff and adjustment valve 21, 22 is provided with a connecting rod 18 which has, as shown, three operational positions. In position "A", both the port 19 and the connecting port 20 are open. During movement of rod 18 from position "A" to position "B", the shutoff valve 21 becomes closed, while adjustment valve 22 remains open. The flow of heating oil through throttle gap 26 and on to flow apportioner 5 thus increases as valve 21 is closed. When valve 21 is fully closed the pressure is servocontrol chamber 25 behind valve body 23 remains the same as that in sump 1 because valve 22 remains open. During the further movement of rod 18 from position "B" to position "C", adjustment valve 22 slowly is closed. The pressure in servocontrol chamber 25 adjusts to the pressure in conduit 7 upstream from throttle 26 by pressure exerted through compensation port 24 in valve body 23 and an equilibrium is thus established between the pressure of the heating oil upstream from throttle 26 and the sum of the contact pressure of spring 27 and the pressure in chamber 25. Of course the pressure in chamber 25 and the operation of the servomechanism is controlled simply by adjustment of the position of rod 18 between the extremes of positions "B" and "C".

The heating oil flow is conducted to apportioner 5, which includes a temperature-sensitive body 29 that swells and contracts to move slide valve element 30, which is initially biased by spring 31 toward the right in FIG. 5. Thus, port 32 operates to apportion, as a function of temperature, the flow of oil between conduit 7, which leads to fluid to air heat exchanger 4, and shunt circuit conduit 9, which leads to the suction of high-pressure supply pump 2 via conduit 6. In this connection, it should be noted that as the temperature of body 29 increases, the flow to conduit 7 increases and the flow to conduit 9 decreases.

FIG. 5 thus illustrates that load element 3 may be designed as a variable throttle valve 23 in which the size of the throttle gap 26 is controlled as a function of the pressure conditions prevailing in the throttle valve. Cooperating with spring 27, the pressure in servocontrol 25 acts on valve element 23 to push the latter in the direction of closing the gap 26. Servocontrol chamber 25 is connected on one side, via a small cross-section bore 24 in element 23, to the upstream side of the throttle gap and, on the other side, via a line provided with an adjustment valve 22, to the sump 1. By regulating the flow volume with the adjustment valve by manual manipulation of rod 18 between position "B" and "C", the pressure in servocontrol chamber 25 may be selectively varied between the pressure upstream of throttle 23 and that in sump 1.

The discharge side of pump 2 may be provided with a system for at least partially bypassing heater 4 and throttle 3. In such case, shutoff valve 21 is required for the bypass system. Shutoff valve 21 and adjustment valve 22 may conveniently be combined into a hand-operated control element which connects the zones of action of both valves. As a first step, throttle valve element 23 is increasingly acted upon by closing shutoff valve 21. Subsequently, the pressure from spring 27 which pushes valve element 23 toward throttle gap 26, is gradually supplemented by closing adjustment valve 22 enough to permit the pressure in servocontrol chamber 25 to increase, thereby increasing the power dissipation in throttle gap 26 and, thus, the development of heat.

Some or all of the components, that is load element 3, flow apportioner 5, shutoff valve 21 and adjustment valve 22 may be combined together in a single housing, as shown in FIG. 5.

Figure 6:
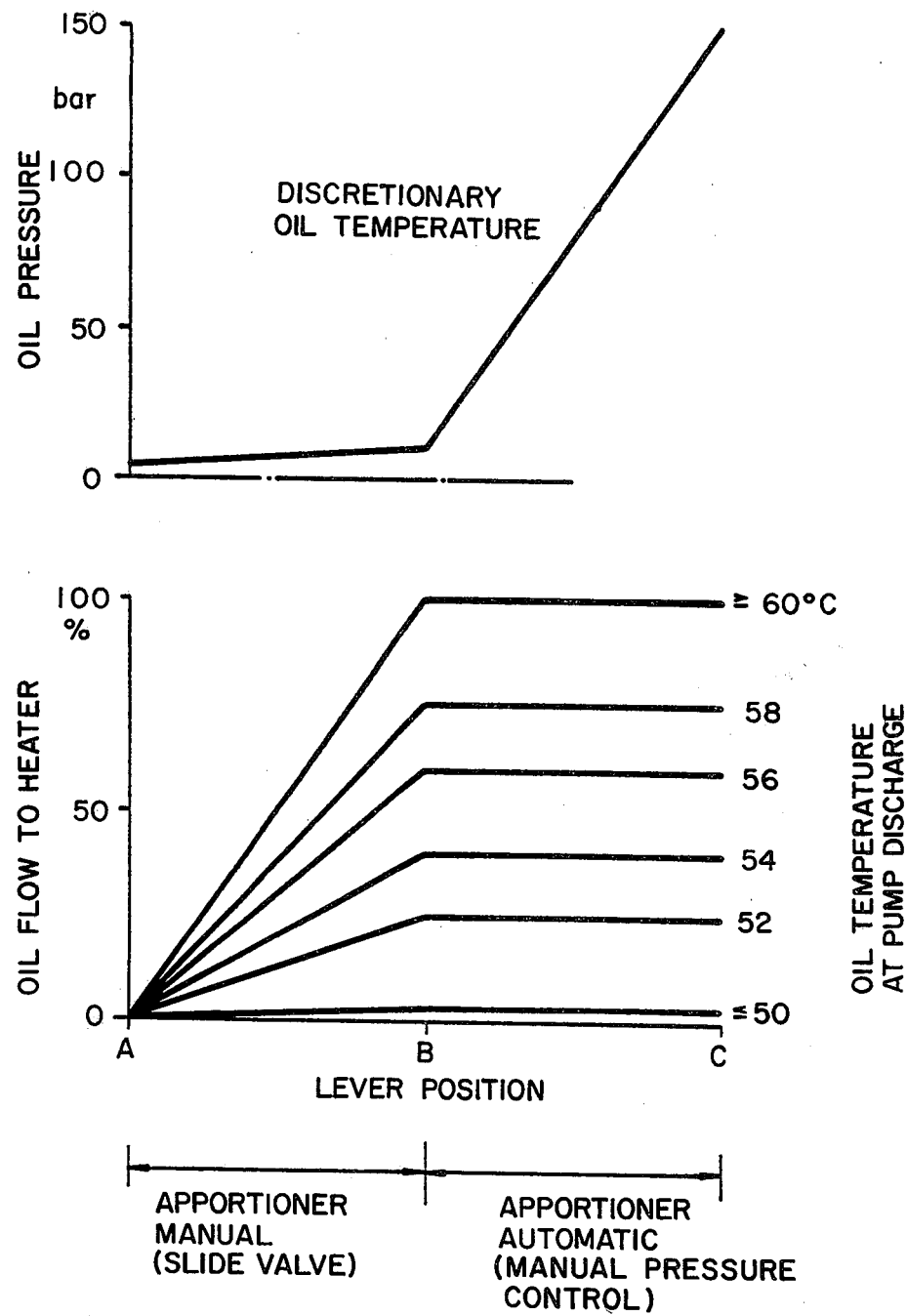
FIG. 6 is a combination of graphs which illustrate the functions of the shutoff and adjustment valves.

FIG. 6 simply illustrates the dependency of the flow of the heating oil to the fluid to air heat exchanger 4, as well as the dependency of the pressure of the heating oil upstream of the throttle 26, on the position of the shutoff and adjustment valve 21, 22, using the temperature of the heating oil at the pump discharge as a parameter.

To control flow apportioners 5 and 15, one may employ various temperature-sensitive control elements or those that are dependent upon temperature differences. And it will be appreciated by those skilled in the art that flow apportioners 5 and 15 may be designed to operate as a function of a temperature differential between the oil in return conduit 8 and oil in sump suction conduit 6.

In order to further improve heat efficiency, fluid to fluid heat exchanger 13 may be connected in conduits 6 and 8 as shown in FIG. 4. This causes the oil at the pump suction to be preheated whenever the temperature of the oil returned from the cabin exchanger 4 rises above the sump temperature. To avoid a reverse heat flux, a bypass and various options may be provided for appropriate control.

In addition to the regulation of the hot oil flow, the heating-air current may also be controlled such that it is supplied to the space to be heated in variable quantities.

We claim:

1. Apparatus for heating the operator's cabin of a machine driven by an internal combustion engine having an oil sump, said apparatus comprising:
    a high-pressure lubricating oil pump having a suction and a discharge;
    first conduit means for hydraulically interconnecting said suction and said sump;
    a load element having an inlet connection and an outlet connection and operable to heat oil passing therethrough;
    second conduit means hydraulically interconnecting the discharge of the pump and the inlet connection of the load element;
    fluid to air heat exchanger means adapted for mounting in said cabin for heating air in the latter, said exchanger having inlet and outlet heating oil connections;
    conduit structure for hydraulically interconnecting the outlet connection of the load element and said sump, said conduit structure comprising a third conduit means hydraulically interconnecting the outlet connection of the load element and the inlet connection of the exchanger means and a fourth conduit means for hydraulically interconnecting the outlet connection of the exchanger means and said sump; and
    adjustable flow apportionment means positioned in said conduit structure for selectively apportioning the flow of heated oil downstream from said load element between a shunt stream and a sump return stream for introducing heat from said shunt stream into the oil at the pump suction to a predetermined temperature level above an initially low temperature level of the sump oil, said flow apportionment means being arranged such that said sump return stream is directed to the sump through the conduit structure, and such that heat is delivered to said heat exchanger means at said predetermined temperature level.

2. Apparatus as set forth in claim 1 wherein is included conduit and coupling means for introducing said shunt stream directly into said first conduit means.

3. Apparatus as set forth in claim 1 wherein is included a fluid to fluid heat exchanger located for exchanging heat between the fluid in said first conduit means and said shunt stream, the arrangement being such that the shunt stream then flows from the fluid to fluid exchanger and into the sump.

4. Apparatus as set forth in claim 1 wherein is included temperature responsive control means coupled with said flow apportionment means for adjusting the latter as a function of the temperature of the oil at one or more preselected points in the system.

5. Apparatus as set forth in claim 1 wherein said flow apportionment means is located upstream from the fluid to air exchanger and in said third conduit means.

6. Apparatus set forth in claim 1 wherein said flow apportionment means is located downstream from the fluid to air exchanger and in said fourth conduit means.

7. Apparatus as set forth in claim 2 wherein said flow apportionment means is located upstream from the fluid to air exchanger and in said third conduit means.

8. Apparatus as set forth in claim 3 wherein said flow apportionment means is located downstream from the fluid to air exchanger and in said fourth conduit means.

9. Apparatus as set forth in claim 7 wherein is included temperature responsive control means coupled with said apportionment means for adjusting the latter as a function of the temperature of the oil at one or more preselected points in the system.

10. Apparatus as set forth in claim 8 wherein is included temperature responsive control means coupled with said apportionment means for adjusting the latter as a function of the temperature of the oil at one or more preselected points in the system.

11. Apparatus as set forth in claim 2 wherein said apportionment means is located downstream from the fluid to air exchanger and in said fourth conduit means.

12. Apparatus as set forth in claim 11 wherein is included temperature responsive control means coupled with said apportionment means for adjusting the latter as a function of the temperature of the oil at one or more preselected points in the system.

13. Apparatus as set forth in claim 9 wherein one said point is in the sump.

14. Apparatus as set forth in claim 11 wherein one said point is in the sump.

15. Apparatus as set forth in claim 12 wherein said point is in the sump.

16. Apparatus as set forth in claim 1 wherein said load element comprises throttle means.

17. Apparatus as set forth in claim 7 wherein said load element comprises throttle means.

18. Apparatus as set forth in claim 8 wherein said load element comprises throttle means.

19. Apparatus as set forth in claim 11 wherein said load element comprises throttle means.

20. Apparatus as set forth in claim 16 wherein said throttle means includes a variable throttle member.

21. Apparatus as set forth in claim 20 wherein said throttle member is elongated and is mounted for longitudinal movement, said member having a truncated conical head at the high pressure end thereof and being spring loaded at the other end, there being a compensating port extending through the member from one end to the other end, the latter end being disposed in a chamber presenting a servomechanism, said valve means further including an adjustment valve controlling the flow from the chamber.

* * * * *